US009048536B2

(12) United States Patent
Ho et al.

(10) Patent No.: US 9,048,536 B2
(45) Date of Patent: Jun. 2, 2015

(54) MOBILE COMMUNICATION DEVICE AND IMPEDANCE MATCHING METHOD THEREOF

(75) Inventors: Chien-Ting Ho, Taoyuan County (TW);
Chun-Wei Hsu, Taoyuan County (TW);
Chung-Chi Lai, Taoyuan County (TW);
Chih-Chin Su, Taoyuan County (TW);
Wan-Ming Chen, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 253 days.

(21) Appl. No.: 13/544,973

(22) Filed: Jul. 9, 2012

(65) Prior Publication Data
US 2014/0009362 A1 Jan. 9, 2014

(51) Int. Cl.
*H01Q 1/50* (2006.01)
*H01Q 1/24* (2006.01)
*H04B 1/04* (2006.01)
*H04B 1/18* (2006.01)
*H04B 1/40* (2006.01)

(52) U.S. Cl.
CPC ............... *H01Q 1/242* (2013.01); *H04B 1/04* (2013.01); *H04B 1/18* (2013.01); *H04B 1/40* (2013.01); *H04B 1/0458* (2013.01)

(58) Field of Classification Search
USPC .............................. 343/702, 861, 850; 455/77
See application file for complete search history.

(56) References Cited

U.S. PATENT DOCUMENTS

| 4,493,112 A | 1/1985 | Bruene |
| 5,564,086 A | 10/1996 | Cygan et al. |
| 8,320,850 B1 * | 11/2012 | Khlat ............................ 455/107 |
| 2007/0194859 A1 * | 8/2007 | Brobston et al. ............. 333/17.3 |

FOREIGN PATENT DOCUMENTS

| CA | 2777065 | 4/2011 |
| CN | 1633037 | 6/2005 |
| CN | 1692549 | 11/2005 |
| DE | 3007554 | 9/1981 |
| DE | 10340808 | 3/2005 |
| EP | 1843477 | 10/2007 |

(Continued)

OTHER PUBLICATIONS

"Office Action of China Counterpart Application", issued on Dec. 17, 2014, p. 1-p. 8.

(Continued)

*Primary Examiner* — Dieu H Duong
(74) *Attorney, Agent, or Firm* — Jianq Chyun IP Office

(57) ABSTRACT

A mobile communication device and an impedance matching method thereof are provided. The mobile communication device includes an antenna, a power amplifier, a tunable matching circuit, a power detection circuit and a controller. The tunable matching circuit determines an output impedance encountered by a radio frequency (RF) signal transmitted by the power amplifier to the antenna when the RF signal enters the tunable matching circuit. The power detection circuit detects a forward power of the RF signal entering the antenna and a reflected power of the antenna. The controller tunes the tunable matching circuit according to a frequency range currently used by the mobile communication device, the forward power and the reflected power to steer the output impedance toward a corresponding load-pull impedance that the power amplifier has in the frequency range.

14 Claims, 3 Drawing Sheets

(56) References Cited

FOREIGN PATENT DOCUMENTS

| TW | M316507 | 8/2007 |
| TW | I343674 | 6/2011 |
| TW | I351789 | 11/2011 |
| TW | I353688 | 12/2011 |

OTHER PUBLICATIONS

"Office Action of Taiwan Counterpart Application", issued on Jul. 24, 2014, p. 1-p. 3.

* cited by examiner

MOBILE COMMUNICATION DEVICE AND IMPEDANCE MATCHING METHOD THEREOF

BACKGROUND OF THE DISCLOSURE

1. Technical Field

The invention relates to a mobile communication device, and more particularly, to an impedance matching method for the mobile communication device.

2. Background

Impedance matching is important to any mobile communication device which uses an antenna for transmitting signals. When a power amplifier of the mobile communication device transmits a radio frequency (RF) signal to the antenna, if the antenna shows bad impedance matching, a part of forward power will be reflected by the antenna, which substantially reduces transmit power of the antenna. Different types of antennas have different impedances. The antenna impedance changes when the environment changes, e.g., when a user's hand is close to the mobile communication device or when the mobile communication device is close to a table surface. Moreover, the manner of change varies among different types of antennas. These facts add more complexities to the issue of impedance matching.

Most conventional mobile communication devices use a tunable matching circuit to make the impedance encountered by the RF signal equal to a load-pull impedance corresponding to the power amplifier. The load-pull impedance is the best impedance among the impedances possibly encountered by the RF signal being outputted from the power amplifier, and that is, the load-pull impedance is capable of reducing the reflection of the RF signal by the antenna to a minimum, even to zero.

Such tunable matching circuit has one or more tunable capacitors or tunable inductors, and the impedance of each tunable capacitor and tunable inductor is tunable, thereby tuning the aforementioned impedance encountered by the RF signal. Each tunable capacitor and tunable inductor has a tunable range covering multiple setting values. A traditional approach is trial and error, i.e. to try each setting value one by one until the tunable matching circuit is able to provide the load-pull impedance. This approach may take longer to complete, thus indirectly degrading performance of the antenna.

SUMMARY

The invention provides a mobile communication device and an impedance matching method to avoid using the traditional trial and error approach and to quickly accomplish the best impedance matching.

The invention proposes a mobile communication device, including an antenna, a power amplifier, a tunable matching circuit, a power detection circuit, and a controller. The tunable matching circuit is coupled between the antenna and the power amplifier, and determines an output impedance encountered by an RF signal transmitted by the power amplifier to the antenna when the RF signal enters the tunable matching circuit. The power amplifier is also coupled between the antenna and the power amplifier, and detects a forward power of the RF signal entering the antenna and a reflected power of the antenna. The controller is coupled to the tunable matching circuit and the power detection circuit, and tunes the tunable matching circuit according to a frequency range currently used by the mobile communication device, the forward power and the reflected power to steer the output impedance toward a corresponding load-pull impedance that the power amplifier has in the frequency range.

The invention also proposes an impedance matching method. The method is adapted for the mobile communication device described above and includes the following steps. First, the forward power of the RF signal entering the antenna and the reflected power of the antenna are detected. Then, the tunable matching circuit is tuned according to the frequency range currently used by the mobile communication device, the forward power and the reflected power, such that the output impedance is steered toward the corresponding load-pull impedance that the power amplifier has in the frequency range.

Based on the above, the power detection circuit and the controller of the invention constitute a control loop, which steers the output impedance encountered by the RF signal promptly toward the load-pull impedance, so as to quickly complete the best impedance matching.

In order to make the aforementioned features and advantages of the invention more comprehensible, embodiments accompanied with figures are described in detail below.

DETAILED DESCRIPTION

Figure 1:
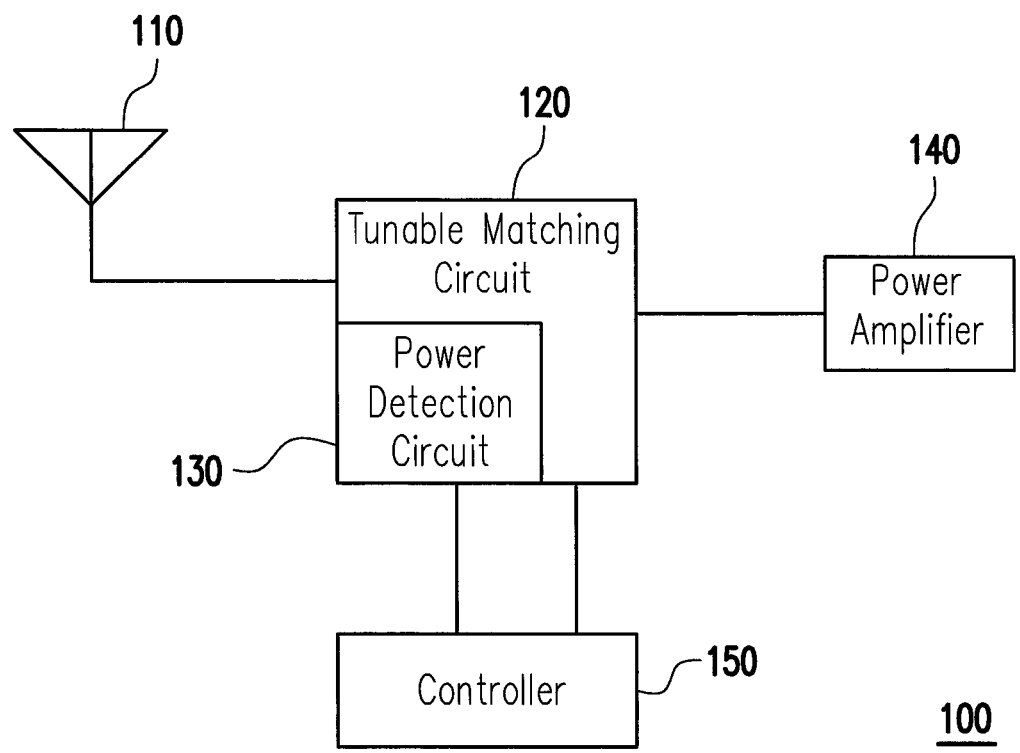
FIG. 1 is a schematic drawing of a mobile communication device according to an embodiment of the invention.

FIG. 1 is a schematic drawing of a mobile communication device 100 according to an embodiment of the invention. The mobile communication device 100 includes an antenna 110, a tunable matching circuit 120, a power detection circuit 130, a power amplifier 140, and a controller 150. The tunable matching circuit 120 is coupled between the antenna 110 and the power amplifier 140. The power detection circuit 130 is also coupled between the antenna 110 and the power amplifier 140. The controller 150 is coupled to the tunable matching circuit 120 and the power detection circuit 130.

The antenna 110 transmits or receives an RF signal to accomplish communication functions of the mobile communication device 100. The power amplifier 140 provides the RF signal to be transmitted by the antenna 110. The tunable matching circuit 120 determines an output impedance encountered by the RF signal transmitted by the power amplifier 140 to the antenna 110 when the RF signal enters the tunable matching circuit 120. The controller 150 may be a central processing unit (CPU) of the mobile communication device 100, a processor of the mobile communication device 100, or an embedded controller of the mobile communication device 100.

Figure 2:
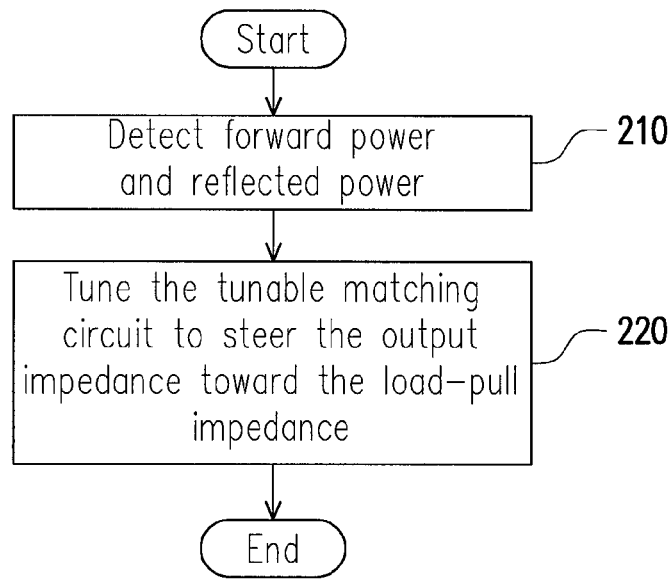
FIG. 2, FIG. 3 and FIG. 4 are flow charts of impedance matching methods according to different embodiments of the invention.

FIG. 2 is a flow chart of an impedance matching method according to an embodiment of the invention. The method is executed by the mobile communication device 100. First, in step 210, the power detection circuit 130 detects a forward power of the RF signal entering the antenna 110 and a reflected power of the antenna 110. Then, in step 220, the controller 150 tunes the tunable matching circuit 120 according to a frequency range currently used by the mobile communication device 100, the forward power of the RF signal entering the antenna 110 and the reflected power of the antenna 110, to steer the output impedance of the power amplifier 140 toward a corresponding load-pull impedance that the power amplifier 140 has in the frequency range.

Figure 3:
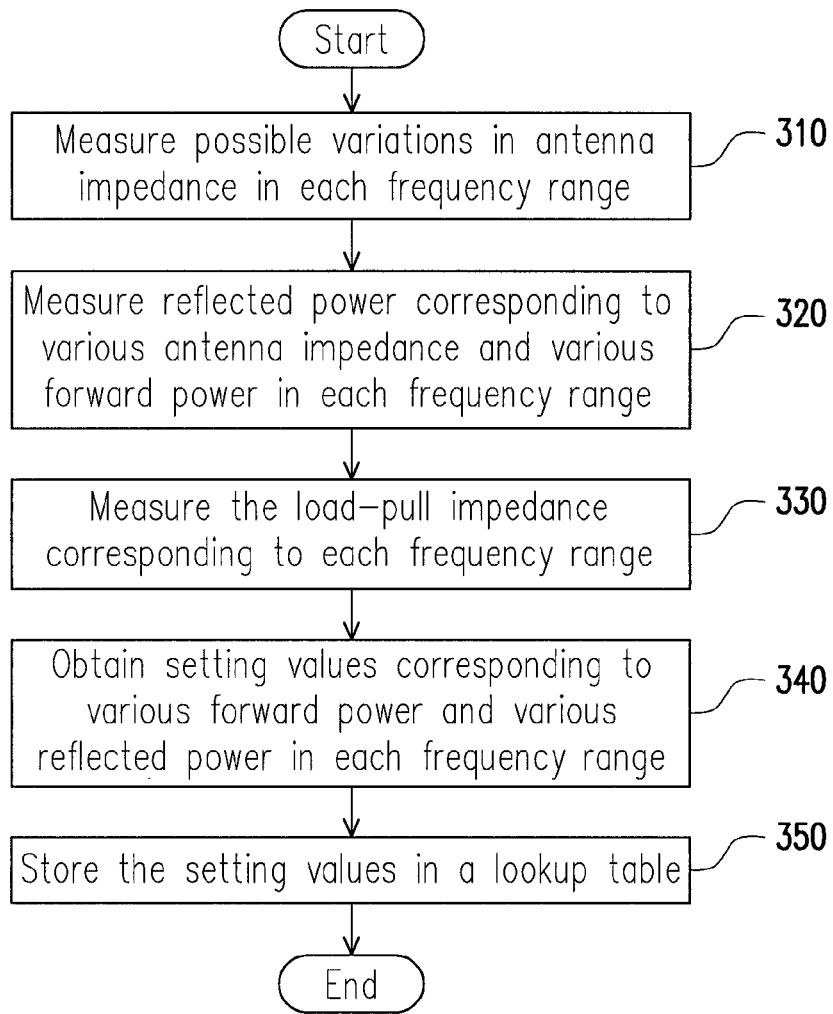

In this embodiment, the controller 150 obtains setting values required by the tunable matching circuit 120 from a lookup table. FIG. 3 illustrates a process of producing the lookup table of this embodiment. The process of FIG. 3 is performed in a laboratory of a manufacturer of the mobile communication device 100.

The mobile communication device 100 uses a plurality of frequency ranges. Frequencies in these frequency ranges do not overlap with each other, wherein each frequency range may be a frequency band used by a communications protocol supported by the mobile communication device 100, or a channel of a communications protocol supported by the mobile communication device 100. In the Global System for Mobile Communications (GSM), for example, GSM 900 and GSM 1800 use different frequency bands. The frequency band for GSM 900 is divided into 124 channels, and the frequency band for GSM 1800 is divided into 374 channels. If the mobile communication device 100 supports both GSM 900 and GSM 1800, the frequency bands for GSM 900 and GSM 1800 may be respectively set to two frequency ranges, or all channels of GSM 900 and GSM 1800 may be respectively set to 498 frequency ranges.

The process of FIG. 3 is explained below. In step 310, possible variations in impedance of the antenna 110 in each frequency range used by the mobile communication device 100 are measured. In terms of the possible variations, various conditions of use that may happen, e.g., the variations in the antenna impedance in cases where the mobile communication device 100 is close to various objects such as a user's hand or a table surface at various distances, have to be taken into account. In step 320, the reflected powers of the antenna 110 corresponding to combinations of various different impedances of the antenna 110 and various different forward powers of the power amplifier 140 in each frequency range used by the mobile communication device 100 are measured. In step 330, the load-pull impedance corresponding to the power amplifier 140 in each frequency range used by the mobile communication device 100 is measured. As described above, the tunable matching circuit 120 determines an output impedance encountered by the RF signal transmitted by the power amplifier 140 to the antenna 110 when the RF signal enters the tunable matching circuit 120. In each frequency range, the load-pull impedance is exactly the best output impedance capable of reducing the reflected power of the antenna 110 with respect to the RF signal to a minimum.

After step 320 is performed, corresponding relationships among the forward power of the power amplifier 140, the reflected power of the antenna 110, and the impedance of the antenna 110, in each frequency range, are obtained. After step 330 is performed, the load-pull impedance corresponding to each frequency range is obtained. Then, in step 340, the best configuration of the tunable matching circuit 120 when the antenna 110 presents various different impedances in each frequency range is found out, so as to steer the output impedance encountered by the RF signal entering the tunable matching circuit 120 toward the load-pull impedance corresponding to the frequency range as close as possible. The most ideal situation is to make the output impedance equal to the load-pull impedance; if the equalization is unlikely to be reached, the output impedance should at least be set to the value closest to the load-pull impedance.

The tunable matching circuit 120 includes at least one tunable element, each tunable element being a tunable inductor or a tunable capacitor. The best configuration of the tunable matching circuit 120 is to find out the best setting value of each tunable element, which can be achieved by several traditional methods. The setting value of each tunable element determines the impedance of the tunable element, and the output impedance is jointly determined by the impedances of these tunable elements. The setting values of all the tunable elements constitute a set of setting values. In step 340, a set of setting values corresponding to the tunable matching circuit 120 has to be determined for combinations of each frequency range and each impedance of the antenna 110.

With the above information, as long as the currently used frequency range, the forward power of the power amplifier 140, and the reflected power of the antenna 110 are clear, the current impedance of the antenna 110 can be obtained based on the corresponding relationships measured in step 320. Then, a set of setting values corresponding to the current frequency range and antenna impedance is obtained. In step 350, each set of setting values corresponding to each combination of different frequency ranges, different forward powers and different reflected powers is stored in a lookup table. The lookup table is stored in the controller 150 or a storage device of the mobile communication device 100.

Figure 4:
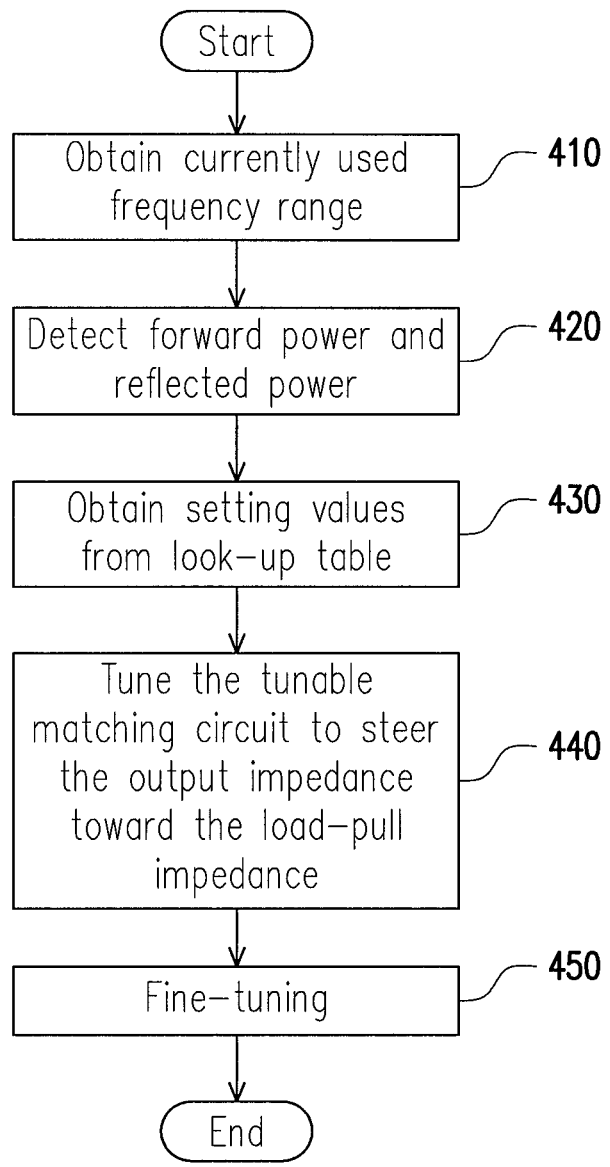

FIG. 4 is a flow chart of another impedance matching method according to another embodiment of the invention. The method is executed by the mobile communication device 100. In step 410, the controller 150 obtains the frequency range which the mobile communication device 100 is currently using. Conventional mobile communication devices are generally capable of obtaining the currently used frequency bands and channels, and thus the details thereof are omitted. In step 420, the power detection circuit 130 detects the forward power of the power amplifier 140 and the reflected power of the antenna 110. In step 430, the controller 150 obtains a set of setting values corresponding to the combination of the currently used frequency range, the forward power and the reflected power from the lookup table and according to the currently used frequency range, the forward power and the reflected power. In step 440, the controller 150 tunes the tunable matching circuit 120 with the set of setting values to steer the output impedance of the power amplifier 140 toward the load-pull impedance.

Next, in step 450, the controller 150 fine-tunes the tunable matching circuit 120 to steer the output impedance of the power amplifier 140 more toward the load-pull impedance. There are several traditional methods for the fine tuning, and thus the details thereof are omitted herein. If the reflected power of the antenna 110 is lower than an allowable preset threshold value after the tunable matching circuit 120 is tuned in step 440, the fine tuning in step 450 can be omitted.

The power detection circuit 130 keeps detecting the forward power and the reflected power. The mobile communication device 100 performs the impedance matching method in FIG. 2 or FIG. 4 when one or both of the forward power and the reflected power vary. On the other hand, the mobile communication device 100 also performs the impedance matching method in FIG. 2 or FIG. 4 when a strength of a signal from a base station is smaller than the preset threshold value. As the impedance matching requirements are decreased when the signal from the base station is strong enough, power can be saved by not performing the impedance matching method. Alternatively, the above two conditions may be combined. That is, the mobile communication device 100 performs the impedance matching method in FIG. 2 or FIG. 4 only when a strength of a signal from a base station is smaller than the preset threshold value and at least one of the forward power and the reflected power varies.

In summary, the invention actively detects the forward power and the reflected power of the RF signal and tunes the tunable matching circuit accordingly. Since the invention utilizes the lookup table to store the predetermined best setting values without trying all possible setting values one by one, the tunable matching circuit is promptly tuned and the time for optimizing the impedance matching is significantly shortened. The shortening of time saves the power of the mobile communication device. In addition, the invention saves more power by performing impedance matching only when specific conditions are met.

Though the invention has been disclosed above by the embodiments, they are not intended to limit the invention. It will be apparent to one of ordinary skill in the art that modifications and variations to the described embodiments may be made without departing from the spirit and scope of the invention. Therefore, the protecting range of the invention falls in the appended claims.

What is claimed is:

1. A mobile communication device comprising:
    an antenna;
    a power amplifier;
    a tunable matching circuit coupled between the antenna and the power amplifier, determining an output impedance encountered by a radio frequency (RF) signal transmitted by the power amplifier to the antenna when the RF signal enters the tunable matching circuit;
    a power detection circuit coupled between the antenna and the power amplifier, detecting a forward power of the RF signal entering the antenna and a reflected power of the antenna; and
    a controller coupled to the tunable matching circuit and the power detection circuit, tuning the tunable matching circuit according to a frequency range currently used by the mobile communication device, the forward power and the reflected power to steer the output impedance toward a corresponding load-pull impedance that the power amplifier has in the frequency range,
    wherein the controller tunes the tunable matching circuit according to the frequency range, the forward power and the reflected power to steer the output impedance toward the load-pull impedance when a strength of a signal from a base station is smaller than a threshold value.

2. The mobile communication device of claim 1, wherein the controller tunes the tunable matching circuit according to the frequency range, the forward power and the reflected power to steer the output impedance toward the load-pull impedance when the forward power and/or the reflected power varies.

3. The mobile communication device of claim 1, wherein the controller tunes the tunable matching circuit according to the frequency range, the forward power and the reflected power to steer the output impedance toward the load-pull impedance when a strength of a signal from a base station is smaller than a threshold value and the forward power and/or the reflected power varies.

4. The mobile communication device of claim 1, wherein the controller obtains a set of setting values from a lookup table according to the frequency range, the forward power and the reflected power, and tunes the tunable matching circuit with the set of setting values to steer the output impedance toward the load-pull impedance.

5. The mobile communication device of claim 4, wherein the mobile communication device uses a plurality of frequency ranges, each of the frequency ranges being a frequency band or channel used by a communications protocol supported by the mobile communication device, each of the frequency ranges corresponding to at least one set of setting values in the lookup table.

6. The mobile communication device of claim 4, wherein the tunable matching circuit includes at least one tunable element, each of the tunable elements being a tunable inductor or a tunable capacitor, the set of setting values including a setting value of each of the tunable elements, the setting value of each of the tunable elements determining an impedance of the tunable element, the impedance of the at least one tunable element determining the output impedance.

7. The mobile communication device of claim 1, wherein the controller fine-tunes the tunable matching circuit after tuning the tunable matching circuit to steer the output impedance more toward the load-pull impedance.

8. An impedance matching method adapted for a mobile communication device, the mobile communication device comprising an antenna, a tunable matching circuit and a power amplifier, the tunable matching circuit being coupled between the antenna and the power amplifier and determining an output impedance encountered by a radio frequency (RF) signal transmitted by the power amplifier to the antenna when the RF signal enters the tunable matching circuit, the impedance matching method comprising:
    detecting a forward power of the RF signal entering the antenna and a reflected power of the antenna;
    tuning the tunable matching circuit according to a frequency range currently used by the mobile communication device, the forward power and the reflected power to steer the output impedance toward a corresponding load-pull impedance that the power amplifier has in the frequency range; and
    tuning the tunable matching circuit according to the frequency range, the forward power and the reflected power to steer the output impedance toward the load-pull impedance when a strength of a signal from a base station is smaller than a threshold value.

9. The impedance matching method of claim 8, further comprising:
    tuning the tunable matching circuit according to the frequency range, the forward power and the reflected power to steer the output impedance toward the load-pull impedance when the forward power and/or the reflected power varies.

10. The impedance matching method of claim 8, further comprising:
    tuning the tunable matching circuit according to the frequency range, the forward power and the reflected power to steer the output impedance toward the load-pull impedance when a strength of a signal from a base station is smaller than a threshold value and the forward power and/or the reflected power varies.

11. The impedance matching method of claim 8, wherein the step of tuning the tunable matching circuit comprises:
    obtaining a set of setting values from a lookup table according to the frequency range, the forward power and the reflected power; and
    tuning the tunable matching circuit with the set of setting values to steer the output impedance toward the load-pull impedance.

12. The impedance matching method of claim 11, wherein the mobile communication device uses a plurality of frequency ranges, each of the frequency ranges being a frequency band or channel used by a communications protocol supported by the mobile communication device, each of the frequency ranges corresponding to at least one set of setting values in the lookup table.

13. The impedance matching method of claim 11, wherein the tunable matching circuit includes at least one tunable element, each of the tunable elements being a tunable inductor or a tunable capacitor, the set of setting values including a setting value of each of the tunable elements, the setting value of each of the tunable elements determining an impedance of the tunable element, the impedance of the at least one tunable element determining the output impedance.

14. The impedance matching method of claim 8, after the step of tuning the tunable matching circuit, further comprising:
  fine-tuning the tunable matching circuit to steer the output impedance more toward the load-pull impedance.

* * * * *